Figure 3:
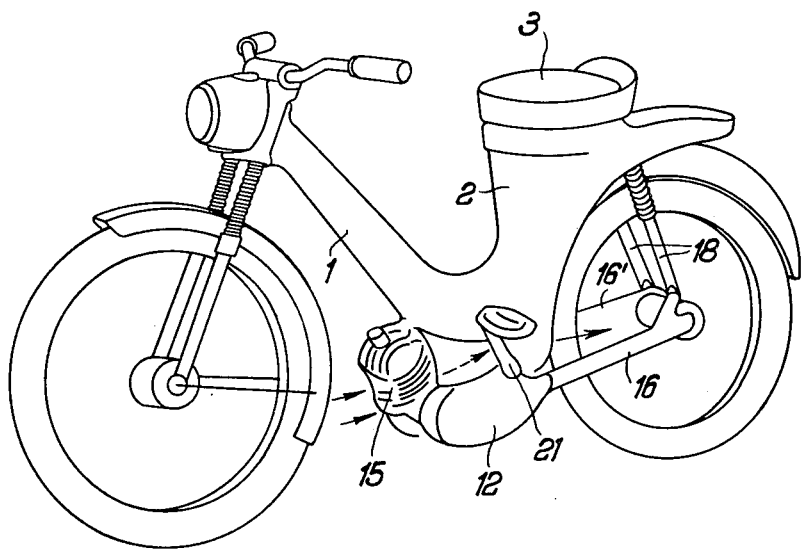

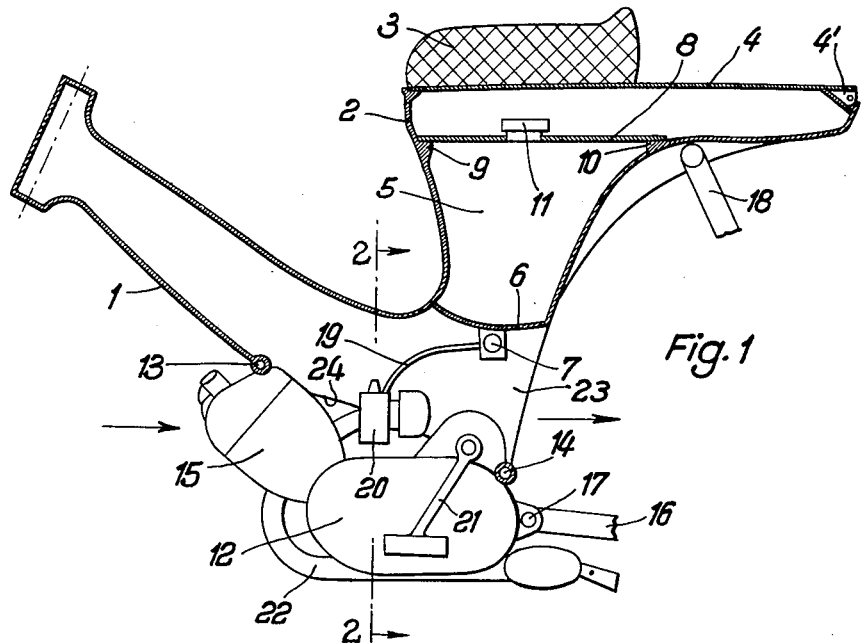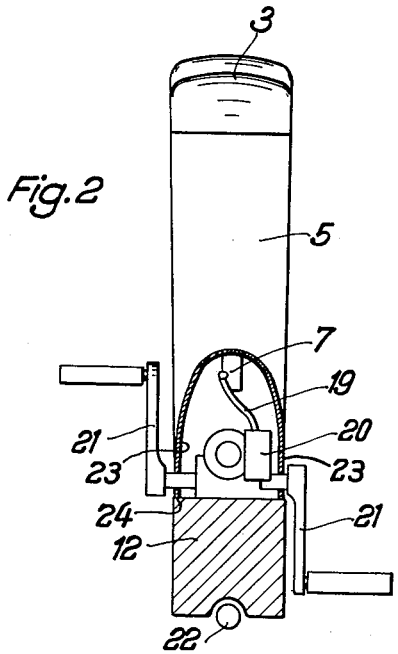

July 24, 1956  H. KLAUE  2,755,873
CAST MOTORCYCLE OR LIKE FRAME
Filed Feb. 10, 1954  2 Sheets-Sheet 2

Inventor:
Hermann Klaue

United States Patent Office 2,755,873
Patented July 24, 1956

2,755,873

CAST MOTORCYCLE OR LIKE FRAME

Hermann Klaue, Uberlingen, Bodensee, Germany

Application February 10, 1954, Serial No. 409,418

Claims priority, application Switzerland October 13, 1953

1 Claim. (Cl. 180—35)

This invention relates to the problem of providing a cycle frame which can be produced from a casting of light metal or of synthetic resin and which is suitable for motorised bicycles.

The invention assumes that a cast motorcycle frame which comprises a main hollow downwardly and rearwardly extending front portion, and a hollow seat-supporting portion at an acute angle to said main portion and integral therewith is known, and resides in the fact that the junction of said main and said seat-supporting portions provides a cavity between the side flanges of the frame at said junction forming an inverted channel-shaped passage through said junction from front to back thereof, means being associated with said passage for mounting the engine therein so that slipstream air can flow through said passage between the engine and the frame during use. The engine may be connected to said flanges by means of lugs on the engine and on the frame.

The above arrangement leads to the following advantages: The strengthening bracing of the hollow frame is ensured, the hollow space enclosed by the frame member cannot become dirty and the motor is cooled satisfactorily.

The saddle support is cast in one piece with the main frame carrier which is formed as a hollow member and branches off therefrom at an acute angle; said support is of such a construction that, in its hollow space which is sealed off at the rear by the rear wheel mudguard, there is fitted the petrol tank which is accessible from the top via the lifting seat, while the rear upper portion is formed as a luggage carrier. This construction of the saddle support has the advantage that the petrol tank can be satisfactorily protected and can be so fitted as not to be visible from the outside, while a separate luggage carrier is unnecessary.

The rear upper portion of the saddle support, i. e. the luggage-carrier portion, serves as a support for the telescopically constructed sprung suspension of the bifurcated rear wheel frame stays. On the chain side, the rear wheel chain-stay is hollow for accommodating the chain and is pivotally mounted on the engine transmission block.

The invention hereinbefore described can also be employed in motorcycle and motorised bicycle frames which are not produced from light metal but are pressed, extruded or cast from synthetic material, more particularly synthetic resin.

Further details of the invention will become apparent from the constructional example hereinafter described with reference to Figures 1 to 3 of the accompanying drawings, in which:

Figure 1 shows a longitudinal sectional view of the frame having the flange-connected motor transmission block, Figure 2 illustrates a cross-section 2—2 through the frame and the transmission block, and Figure 3 illustrates the total view of a motorcycle provided with the frame according to the invention.

The motorcycle frame consists of the main frame carrier or front portion 1 and the seat supporting portion 2 which is formed as a hollow body. The saddle 3 is secured to the cover 4 of the hollow seat supporting portion 2, said cover being hinged at the rear about the hinge 4'. The petrol tank 5 is situated in the hollow space of the seat supporting portion 2 of the frame and is closed at the bottom by a cast wall 6 provided with a petrol tap 7. The top of the petrol tank is formed by a metal sheet 8 which can be adhesively secured to the casting projections 9 and 10 with a synthetic resin. The cover sheet 8 has a filling socket 11 for the petrol tank 5.

The motor transmission block 12 is connected to the free lower ends of the sidewalls, such as side flanges 23, of the frame 1 by means of the threaded bolts and lugs 13 and 14. The arrows which can be seen in Figures 1 and 3 indicate the direction of the slipstream which serves for cooling the cylinder 15. The figures make it apparent that the slipstream can flow through the lower part of the frame. The lower edge 24 of the side flanges 23 (Fig. 1) is slanting upwardly forwardly, and the block 12 is for its major portion disposed below said edge 24.

The rear wheel chain stays 16 are pivotally mounted on the motor transmission block 12 by means of bearing bolts 17 and the rear wheel frame stays 18 are resiliently mounted on the seat support member 2 and serve as compression struts. The stay 16 on the chain side is constituted by a hollow member 16' for accommodating the chain.

A petrol pipe 19 leads from the petrol tap 7 to the carburetter 20. The reference 21 designates the pedals and 22 the exhaust pipe.

I claim:

In a motorcycle, having a motor block and front and rear wheels, in combination, a frame formed of a single cast piece of light weight material and including a hollow integral front portion and a hollow seat supporting rear portion connected thereto at an acute angle, said front and rear portions defining a channel disposed in the direction of motorcycle travel and being open at the bottom and at the front and at the rear for suspending said motor block exposed for its major portion below said channel, said channel forming an air passage for the cooling of said motor, said seat supporting portion defining on its interior a gasoline tank and including a movable cover concealing the top of said tank and supporting a seat, and having a rear extension projecting rearwardly above said rear wheel, and substantially upright means between said rear wheel and said rear extension for supporting said frame.

References Cited in the file of this patent

UNITED STATES PATENTS

| | | |
|---|---|---|
| 868,749 | Apple | Oct. 22, 1907 |
| 1,479,738 | Pullin | Jan. 1, 1924 |
| 2,493,287 | Hatfield | Jan. 3, 1950 |

FOREIGN PATENTS

| | | |
|---|---|---|
| 1,033,001 | France | Apr. 1933 |
| 657,203 | Great Britain | Sept. 12, 1951 |
| 667,373 | Great Britain | Feb. 27, 1952 |
| 685,268 | Great Britain | Dec. 31, 1952 |

(Corresponding U. S. 2,604,179, July 22, 1952.)

OTHER REFERENCES

Ser. No. 194,754, Rabe (A. P. C.), published May 25, 1943.